Figure 1:
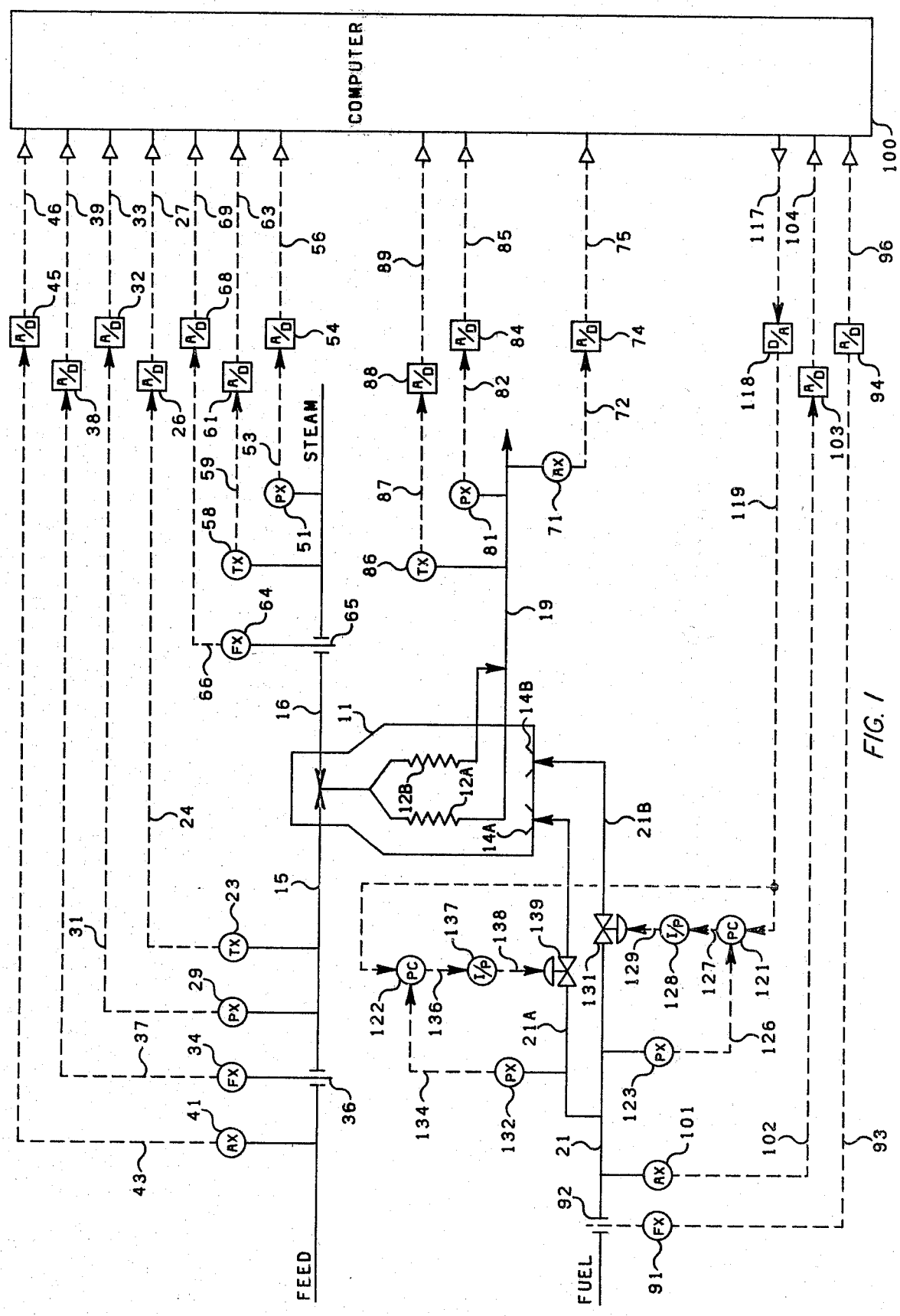

United States Patent [19]

Killebrew, Jr. et al.

[11] 4,236,218
[45] Nov. 25, 1980

[54] CONTROL OF A CRACKING FURNACE

[75] Inventors: Wilbur N. Killebrew, Jr., Phoenix, Ariz.; Charles M. Stewart, Bartlesville, Okla.

[73] Assignee: Phillips Petroleum Company, Bartlesville, Okla.

[21] Appl. No.: 35,197

[22] Filed: May 2, 1979

[51] Int. Cl.³ .................. G05B 13/04; G05D 7/06; G06F 15/46

[52] U.S. Cl. .................. 364/500; 208/DIG. 1; 364/106; 364/116

[58] Field of Search ........... 364/500, 501, 502, 105, 364/106, 116, 118; 208/DIG. 1, 106, 132, 48 R, 48 Q; 422/62; 585/501, 648, 650; 23/230 A

[56] References Cited

U.S. PATENT DOCUMENTS

| | | | |
|---|---|---|---|
| 3,175,968 | 3/1965 | Berger | 364/500 X |
| 3,271,472 | 9/1966 | Ogle et al. | 585/501 |
| 3,473,008 | 10/1969 | Bay et al. | 364/116 X |
| 3,594,559 | 7/1971 | Pemberton | 364/500 |
| 3,619,360 | 11/1971 | Persik, Jr. | 364/116 X |
| 3,758,762 | 9/1973 | Littman et al. | 364/116 |
| 3,824,388 | 7/1974 | Cugini | 364/500 |
| 3,828,171 | 8/1974 | Griffin | 364/501 |

OTHER PUBLICATIONS

Baxley, Jr.–"Computer Control of Severity in Ethylene Cracking Furnaces"–Instrumentation Technology, pp. 39–42, Nov. 1971.

Primary Examiner—Joseph F. Ruggiero

[57] ABSTRACT

The heat supplied to a cracking furnace is controlled so as to maintain a desired conversion rate for the material being cracked in the cracking furnace by comparing a prediction of the conversion rate for the material being cracked in the cracking furnace to a desired conversion rate for the material being cracked in the cracking furnace to thereby determine the heat required to maintain a desired conversion rate for the material being cracked in the cracking furnace. A measured conversion rate for the material being cracked in the cracking furnace is utilized to correct the predicted conversion rate as required. A signal representative of the heat required to maintain a desired conversion rate for the materal being cracking in the cracking furnace is utilized to manipulate the flow of fuel to the cracking furnace to thereby control the heat supplied to the cracking furnace.

43 Claims, 2 Drawing Figures

CONTROL OF A CRACKING FURNACE

This invention relates to control of a cracking furnace. In a particular aspect this invention relates to method and apparatus for controlling the fuel supplied to a cracking furnace so as to maintain a desired conversion rate for a material being cracked.

The cracking furnace forms the heart of many chemical manufacturing processes. Often the performance of the cracking furnace will carry the burden of the major profit potential for the entire manufacturing process. Close control of the cracking furnace is required to both maintain a desired conversion rate in the cracking furnace and to prevent damage to the cracking furnace.

In a manufacturing process such as the manufacture of ethylene, a feedstock such as ethane and/or propane and/or naphtha is fed together with a diluent fluid such as steam into the cracking furnace. Within the furnace, the feed gas is converted to a gaseous mixture which primarily contains hydrogen, methane, ethylene, propylene, butadiene and small amounts of heavier gases. At the furnace exit this mixture is cooled, which allows removal of most of the heavier gases, and compressed.

The compressed mixture is routed through various distillation columns where the individual components such as ethylene and propylene are purified and separated. The separated products, of which ethylene is the major product, then leave the ethylene plant to be used in numerous other processes for the manufacture of a wide variety of secondary products.

The primary function of the cracking furnace is to convert the feedstock to ethylene and/or propylene. The temperature of the cracking furnace determines the percentage of the ethane and/or propane and/or naphtha that will be converted to ethylene and to propylene when other variables such as feed rate, steam rate, feed composition, etc. are constant. The desired percentage conversion for ethane and propane to ethylene is usually specified for a manufacturing process and the fuel supplied to the cracking furnace is controlled so as to maintain the required temperature necessary to maintain the desired percentage conversion. The temperature of the gaseous mixture flowing from the cracking furnace exit or the measured conversion, obtained from a feed analysis and an analysis of the gaseous mixture flowing from the cracking furnace exit, is commonly utilized to provide a means for controlling the fuel supplied to the cracking furnace. The measured parameters are compared to desired parameters and the resulting comparison is utilized to control the flow of fuel to the cracking furnace. This type of control is commonly referred to as feedback control.

If only feedstock control is utilized, no change in the flow rate of fuel to the cracking furnace is made until a process change is reflected in the gaseous mixture flowing from the outlet of the cracking furnace. For example, if the flow rate of the feedstock to the cracking furnace is decreased, the heat per unit of feed required to maintain a desired percent conversion is also decreased. However, if only the changes in the gaseous mixture flowing from the outlet of the cracking furnace are monitored, then the heat per unit of feed supplied to the cracking furnace will not be changed as a function of the change in the flow rate of the feedstock to the cracking furnace. This results in the actual percentage conversion deviating from the desired percentage conversion until such time as the change in the analysis of the gaseous mixture flowing from the cracking furnace (or exit temperature) indicates that the heat per unit of feed supplied to the cracking furnace should be reduced. This may result in long periods of off-specification operation if the flow rate of the feedstock to the cracking furnace is varying or if other variables are not constant.

Feedforward control, which is sometimes termed predictive control, provides a method by which closer control of a cracking furnace can be obtained. In feedforward control, measurements of disturbances are used to provide a prediction of any resulting change in the cracking furnace conversion or a new desired exit temperature which is necessary to compensate for any changes in the measured process variables so that on-specification operation can be maintained. Predictive or feedforward control provides a faster control response to changes in process variables. Actual measurements are utilized to correct the feedforward control signals as necessary.

It is thus an object of this invention to provide method and apparatus for controlling the fuel supplied to a cracking furnace so as to maintain a desired conversion rate for a material being cracked. It is a particular object of this invention to provide method and apparatus for utilizing measurements of process variables to provide feedforward control or prediction of cracking furnace conversion and utilizing a comparison of the desired conversion rate for the material being cracked with the corrected prediction of conversion rate to provide feedback control of the fuel flow to the cracking furnace.

In accordance with the present invention, method and apparatus is provided whereby measurements of the flow rate of the feed material and the steam being provided to the cracking furnace, an analysis of the feed material, and the temperature and pressure at the outlet of the cracking furnace are utilized to predict the actual conversion rate of the material being cracked in the cracking furnace. The prediction of the actual conversion rate for the material being cracked in the cracking furnace is corrected as necessary by a comparison of the predicted conversion rate with the actual measured conversion rate. The corrected prediction of the conversion rate is compared to the desired conversion rate to determine the heat required to maintain the desired conversion rate. A signal representative of the heat required to maintain a desired conversion rate is utilized to manipulate the flow of fuel to the cracking furnace to thereby maintain the percent conversion in the cracking furnace at a desired level.

Figure 2:
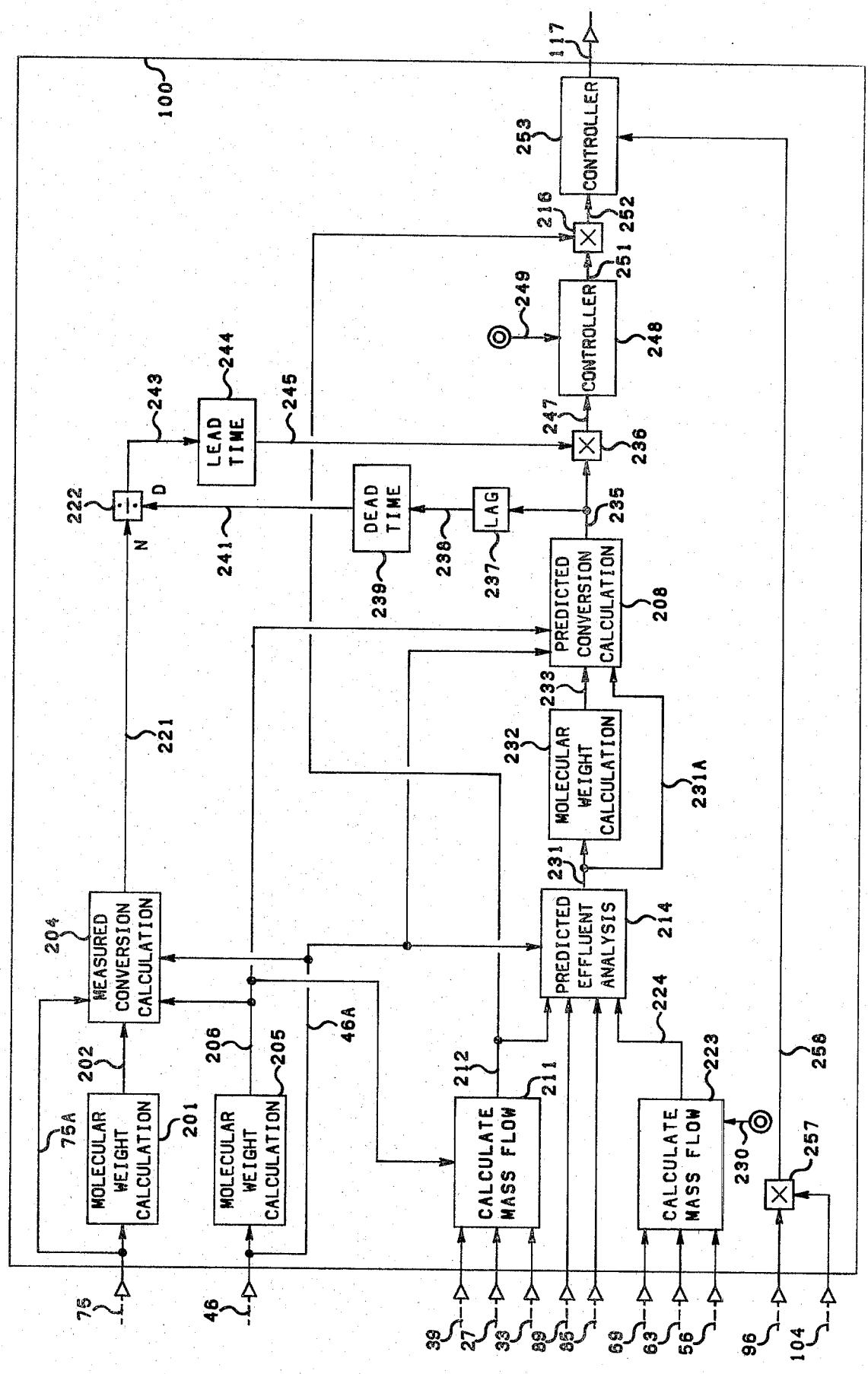

Other objects and advantages of the invention will be apparent from the description of the invention and the appended claims as well as from the detailed description of the drawings in which:

FIG. 1 is a schematic diagram of a cracking furnace with an associated control system; and FIG. 2 is a logic diagram for the computer logic utilized to generate the control signals utilized in the control of the cracking furnace illustrated in FIG. 1.

For the sake of simplicity the invention is illustrated and described in terms of a single cracking furnace having only two burners and heating sections. However, the invention is also applicable to multiple furnaces and is applicable to furnaces having only one burner and heating section or a plurality of burners and heating sections.

The invention is also illustrated and described in terms of a process for the manufacture of ethylene. However, the applicability of the invention described herein extends to other processes wherein a cracking furnace is utilized to crack a feed into some desired components. A specific control configuration is set forth in FIG. 1 for the sake of illustration. However, the invention extends to different types of control system configurations which accomplish the purpose of the invention. Lines designated as signal lines in the drawings are electrical in this preferred embodiment. However, the invention is also applicable to pneumatic, mechanical, hydraulic or other signal means for transmitting information. In almost all control systems some combination of these types of signals will be used. However, use of any other type of signal transmission, compatible with the process and equipment in use, is within the scope of the invention.

Both the analog and digital controllers shown may utilize the various modes of control such as proportional, proportional-integral, proportional-derivative, or proportional-integral-derivative. In this preferred embodiment, proportional-integral controllers are utilized, but any controller capable of accepting two input signals and producing a scaled output signal, representative of a comparison of the two input signals, is within the scope of the invention. The operation of proportional-integral controllers is well known in the art. The output control signal of a proportional-integral controller may be represented as $$S = K_1 E + K_2 \int E dt$$

where
S = output control signals;
E = difference between two input signals; and
$K_1$ and $K_2$ = constants.

The scaling of an output signal by a controller is well known in control systems art. Essentially the output of a controller may be scaled to represent any desired factor or variable. An example of this is where a desired pressure and an actual pressure is compared by a controller. The output could be a signal representative of a desired change in the flow rate of some gas necessary to make the desired and actual pressures equal. On the other hand the same output signal could be scaled to represent a percentage or a temperature. If the controller output can range from 0 to 10 volts, which is typical, then the output signal could be scaled so that an output signal having a voltage level of 5.0 volts corresponds to 50%, some specified flow rate, or some specified temperature.

The various transducing means used to measure parameters which characterize the process and the various signals generated thereby may take a variety of forms or formats. For example, the control elements of the system can be implemented utilizing electrical analog, digital electronic, pneumatic, hydraulic, mechanical or other similar types of equipment or combinations of the invention preferably utilizes a combination of pneumatic control elements, electrical analog signal handling and translation apparatus, and a digital computer, the apparatus and method of the invention can be implemented using a variety of specific equipment available to and understood by those skilled in the process control art. Likewise, the format of the various signals can be modified substantially in order to accommodate signal format requirements of the particular installations, safety factors, the physical characteristics of the measuring or control instruments and other similar factors. For example, a raw flow measurement signal produced by a differential pressure orifice flow meter would ordinarily exhibit a generally proportional relationship to the square of the actual flow rate. Other measuring instruments might produce a signal which is proportional to the measured parameter, and still other measuring instruments may produce a signal which bears a more complicated, but known, relationship to the measured parameter. In addition, all signals could be translated into a "suppressed zero" or other similar format in order to provide a "live zero" and prevent an equipment failure from being erroneously interpreted as a low (or high) measurement or control signal. Regardless of the signal format or the exact relationship of the signal to the parameter which it represents, each signal representative of a measured process parameter or representative of a desired process value will bear a relationship to the measured parameter or desired value which permits designation of a specific measured or desired value by a specific signal value. A signal which is representative of a process measurement or desired process value is therefore one from which the information regarding the measured or desired value can be readily retrieved regardless of the exact mathematical relationship between the signal units and the measured or desired process units.

Referring now to FIG. 1, a conventional cracking furnace 11 is illustrated having two cracking tubes 12a and 12b. Heat is supplied to the two cracking tubes 12a and 12b by means of burners 14a and 14b respectively. As has been previously stated, the cracking furnace 11 is illustrated as having only two burners and two cracking tubes for the sake of convenience. Ordinarily a cracking furnace used in a process such as the manufacture of ethylene will have a larger number of cracking tubes and burners. Also in a process such as the manufacture of ethylene a plurality of cracking furnaces will commonly be utilized.

A feedstock such as ethane and/or propane or naphtha is provided as a feed to the cracking furnace 11 through conduit means 15. Steam is provided to the cracking furnace 11 through conduit means 16. The feed gas flowing through conduit means 15 and the steam flowing through conduit means 16 are combined within the cracking furnace 11 and flow through the cracking tubes 12a and 12b. After passing through the cracking tubes 12a and 12b in which the feed is converted to ethylene, propylene and other gases, the gaseous mixture is combined and flows to various distillation columns through conduit means 19.

Fuel is supplied to the cracking furnace 11 through conduit means 21. Specifically fuel is supplied to burner 14a through conduit means 21a which is operably connected to conduit means 21. Fuel is supplied to burner 14b through conduit means 21b which is also operably connected to conduit means 21.

The cracking furnace, described to this point, is a conventional cracking furnace system. It is the manner in which the cracking furnace, illustrated in FIG. 1, is controlled so as to maintain a desired percent conversion which provides the novel features of the present invention.

Temperature transducer 23 provides a signal 24 which is representative of the temperature of the feed stock flowing through conduit means 15. Signal 24 is provided from the temperature transducer 23 to the analog-to-digital (A/D) converter 26. The A/D converter 26 converts signal 24 to digital form and provides signal 27, representative of the temperature of the feedstock flowing through conduit means 15, to computer means 100. The pressure transducer 29 provides a signal 31 representative of the pressure of the feedstock flowing through conduit means 15. Signal 31 is provided from the pressure transducer 29 to the A/D converter 32. The A/D converter 32 converts signal 31 to digital form and provides a signal 33, representative of the pressure of the feedstock flowing through conduit means 15, to computer means 100. Flow transducer 34 in combination with flow sensor 36, which is operable located in conduit means 15, provides an output signal 37 which is representative of the volume flow rate of the feedstock flowing through conduit means 15. Signal 37 is provided from the flow transducer 34 to the A/D converter 38. The A/D converter 38 converts signal 37 to digital form and provides signal 39, representative of the volume flow rate of the feedstock flowing through conduit means 15, to computer means 100. Analyzer transducer 41, which is preferably a chromatographic analyzer, provides a plurality of output signals which are represented as signal 43. The plurality of output signals, of which signal 43 is representative, are representative of the mol percents of each component in the feedstream flowing through conduit means 15. The specific components analyzed for are hydrogen, methane, ethylene, ethane, propylene, propane, butane, pentane plus, acetylene, propadiene, butadiene and butene. The plurality of signals, of which signal 43 is representative, is provided from the analyzer transducer 41 to a plurality of A/D converters of which A/D converter 45 is representative. The plurality of signals, of which signal 43 is representative, are converted to digital form by the plurality of A/D converters, of which the A/D converter 45 is representative, and are provided as a plurality of signals, of which signal 46 is representative, to computer means 100.

Pressure transducer 51 provides an output signal 53 representative of the pressure of the steam flowing through conduit means 16. Signal 53 is provided from the pressure transducer 51 to the A/D converter 54. Signal 53 is converted to digital form by the A/D converter 54 and is provided as signal 56 to computer means 100. The temperature transducer 58 provides an output signal 59 representative of the temperature of the steam flowing through conduit means 16. Signal 59 is provided from the temperature transducer 58 to the A/D converter 61. Signal 59 is converted to digital form by the A/D converter 61 and is provided as signal 63 to the computer means 100. The flow transducer 64 in combination with the flow sensor 65, which is operably located in conduit means 16, provides an output signal 66 which is representative of the volume flow rate of the steam flowing through conduit means 16. Signal 66 is provided to the A/D converter 68 and is provided as signal 69 to the computer means 100.

Analyzer transducer 71, which is preferably a chromatographic analyzer, provides a plurality of output signals of which signal 72 is representative. The plurality of signals, of which signal 72 is representative, are representative of the mol percent of various components in the effluent flowing through conduit means 19. Specific components analyzed for are hydrogen, methane, ethylene, ethane, propylene, propane, butane, pentane plus, acetylene, propadiene, butadiene and butene. The plurality of signals, of which signal 72 is representative, are provided to a plurality of A/D converters of which A/D converter 74 is representative. The plurality of signals, of which signal 72 is representative, are converted to digital form by the plurality of A/D converters, of which A/D converter 74 is representative, and are provided as a plurality of signals, of which signal 75 is representative, to computer means 100. Pressure transducer 81 provides an output signal 82 which is representative of the pressure of the gaseous mixture flowing through conduit means 19. Signal 82 is provided from the pressure transducer 81 to the A/D converter 84. Signal 82 is converted to digital form by the A/D converter 84 and is provided as signal 85 to computer means 100. The temperature transducer 86 provides an output signal 87 which is representative of the temperature of the gaseous mixture flowing through conduit means 19. Signal 87 is provided from the temperature transducer 86 as an input to the A/D converter 88. Signal 87 is converted to digital form by the A/D converter 88 and is provided as signal 89 to computer means 100.

Analyzer transducer 101, which is preferably a chromatographic analyzer, provides an output signal 102 which is representative of the BTU content of the fuel flowing through conduit means 21. Signal 102 is provided from the analyzer transducer 101 to the A/D converter 103. Signal 102 is converted to digital form by the A/D converter 103 and is provided as signal 104 to the computer means 100. The flow transducer 91 in combination with the flow sensor 92, which is operably located in conduit means 21, provides an output signal 93 which is representative of the volume flow rate of the fuel flowing through conduit means 19. Signal 93 is provided from the flow transducer 91 to the A/D converter 94. Signal 93 is converted to digital form by the A/D converter 94 and is provided as signal 96 to computer means 100.

In response to the described input signals, computer means 100 generates a control signal 117 which is utilized to control the cracking furnace 11. Signal 117, which is representative of the required pressure for the fuel flowing through conduit means 21a and 21b, is provided from the computer means 100 to the D/A converter 118. Signal 117 is converted to analog form by the D/A converter 118 and is provided as signal 119 to pressure controllers 121 and 122. Pressure transducer 123 in combination with a pressure sensing device, which is operably located in conduit means 21b, provides an output signal 126 which is representative of the actual pressure of the fuel flowing through conduit means 21b. Signal 126 is provided from the pressure transducer 123 to the pressure controller 121. The pressure controller 121 compares signal 126 to signal 119 and outputs a signal 127 responsive to the difference between signal 126 and signal 119. Signal 127 is converted to pneumatic form by the current-to-pressure transducer 128 and is provided as signal 129 to the pneumatic control valve 131. The pneumatic control valve 131 is operably located in conduit means 21b. The pneumatic control valve 131 is manipulated in response to signal 129 to thereby control the pressure of the fuel flowing through conduit means 21b to the burner 14b.

Pressure transducer 132 in combination with a pressure sensing device, which is operably located in conduit means 21a, provides an output signal 134 which is representative of the actual pressure of the fuel flowing through conduit means 21a. Signal 134 is provided from the pressure transducer 132 to the pressure controller 122. The pressure controller 122 compares signal 134 to signal 119 and provides an output signal 136 responsive to the difference between signal 134 and signal 119. Signal 136 is converted to pneumatic form by the current-to-pressure (I/P) transducer 137 and is provided as signal 138 to the pneumatic control valve 139. The pneumatic control valve 139 is operably located in conduit means 21a. The pneumatic control valve 139 is manipulated in response to signal 138 to thereby control the pressure of the fuel flowing through conduit means 21a to the burner 14a.

The logic flow diagram utilized to calculate the control signal 117 in response to the previously described input signals to computer means 100 is illustrated in FIG. 2. Referring now to FIG. 2, signal 75 which is representative of the plurality of signals provided by the analyzer transducer 71 illustrated in FIG. 1 is provided as an input of the molecular weight calculation block 201. In the molecular weight calculation block 201 the mol percent of each component in the effluent from the cracking furnace 11 is multiplied by the molecular weight of each respective component. The molecular weights of each component multiplied by the mol percent of each component is then summed to provide signal 202 which is representative of the molecular weight of the effluent flowing from the cracking furnace 11. Equation (1) is utilized in the molecular weight calculation to provide signal 202.

$$E_m = \sum_{i=\text{Hydrogen}}^{\text{Butene}} \text{Mol \%}_i * \text{Mol Weight}_i \qquad (I)$$

where
$E_m$ = total molecular weight of hydrocarbon portion of the effluent flowing from the cracking furnace 11;
Mol %$_i$ = mol % of a specific component in the effluent;
Mol Weight$_i$ = molecular weight of a specific component in the effluent; and
i = the particular constituent in the effluent (hydrogen, methane, ethylene, ethane, propylene, propane, butane, pentane plus, acetylene, propadiene, butadiene, and butene).

Signal 202 is provided from the molecular weight calculation block 201 to the measured conversion calculation block 204.

Signal 75a is one of the plurality of signals which make up signal 75. Signal 75a is representative of either the mol percent of ethane or the mol percent of propane in the effluent flowing from the cracking furnace 11 depending on whether the cracking furnace 11 is being controlled so as to provide a desired percent conversion of ethane or a desired percent conversion of propane. Signal 75a is provided as an input to the measured conversion calculation block 204.

Signal 46, which is representative of the plurality of signals which are provided from the analyzer transducer 41, illustrated in FIG. 1, is provided as an input to the molecular weight calculation block 205. The analysis of the feed, represented by signal 46, is utilized to calculate the molecular weight of the feed in the molecular weight calculation block 205 in the same manner as previously described for the molecular weight calculation block 201 using Equation (I). Signal 206, which is representative of the molecular weight of the feed ($F_m$), is provided from the molecular weight calculation block 205 as an input to the measured conversion calculation block 204, as an input to the predicted conversion calculation 208 and as an input to the calculate mass flow block 211.

Signals 39, 27 and 33 which are respectively representative of the flow rate, temperature and pressure of the feedstream flowing to the cracking furnace 11 are also provided as inputs to the calculate mass flow block 211. Signals 210, 39, 27 and 33 are utilized to calculate the mass flow rate of the feedstream utilizing equation (III).

$$F_R = F_{MEAS} * \sqrt{\frac{P_{MEAS} * F_m}{T_{MEAS}}} \qquad (III)$$

where
$F_R$ = mass flow rate;
$F_{MEAS}$ = measured flow signal;
$T_{MEAS}$ = measured temperature;
$T_{MEAS}$ = measured pressure; and
$F_m$ = the molecular weight of the feedstream.

Signal 212 which is representative of the mass flow rate of the feedstream ($F_R$) is provided from the calculate mass flow block 211 as an input to the predicted effluent analysis block 214 and as an input to the multiplying block 216.

Signal 46a is one of the plurality of signals which make up signal 46. Signal 46a is representative of either the mol percent of ethane or the mol percent of propane in the feed flowing to the cracking furnace 11 depending on whether the cracking furnace 11 is being controlled so as to provide a desired percent conversion of ethane or a desired percent conversion of propane. Signal 46a is provided as an input to the measured conversion calculation block 204 and as an input to the predicted conversion calculation block 208.

Signals 75a, 202, 206 and 46a are utilized in the measured conversion calculation block 204 to calculate the percent conversion of either ethane or propane utilizing equation (IV).

$$C_i = (1.0 - (MOL \%_{iE} * F_m)/(MOL \%_{iF} * E_m)) * 100 \qquad (IV)$$

where
$C_i$ = % conversion of the component i;
i = ethane or propane;
MOL %$_{iE}$ = MOL % of component i in the effluent flowing from the cracking furnace 11;
$F_m$ = the molecular weight of the feedstream;
MOL %$_{iF}$ = MOL % of component i in feedstream; and
$E_m$ = the molecular weight of the effluent flowing from the cracking furnace 11.

Signal 221, which is representative of the measured percent conversion of either ethane or propane ($C_i$), is provided from the measured conversion calculation block 204 as an input of the dividing block 222.

Signals 69, 63 and 56, which are respectively representative of the flow rate, temperature and pressure of the steam flowing through conduit means 16, are provided as inputs to the calculate mass flow block 223. The calculate mass flow block 223 is also provided with the set point signal 230, which is representative of the molecular weight of the steam (18.015). Equation (III) is utilized in the calculate mass flow block 223 to provide signal 224 which is representative of the mass flow rate of the steam, flowing through conduit means 15 ($S_R$).

The parameters of Equation (III) are changed for the steam rather than the feed. Signal 224 is provided from the calculate mass flow block 223 as an input to the predicted effluent analysis block 214. The predicted effluent analysis block 214 is also provided with signals 89 and 85 which are respectively representative of the temperature and pressure of the effluent flow into conduit means 19 from the cracking furnace 11. Equations (V)–(XVI) are utilized to calculate a predicted effluent analysis in response to signals 46a, 212, 89, 85 and 224.

$$MOL\ \%_{HYDROGEN} = (K_1)(E_T)(MF_E) - (K_2)(MF_E)(K_3)(F_R)(MF_E)(K_4)(S_R) + K_5(E_P)(MF_E) + K_6 \quad (V)$$

where
MOL $\%_{HYDROGEN}$ = mol percent hydrogen in the effluent;
$F_R$ = mass flow rate of feed;
$S_R$ = mass flow rate of steam;
$E_T$ = temperature of the effluent
$E_P$ = pressure of the effluent
$MF_E$ = mol fraction of ethane or propane in feed = mol percent of ethane or propane in feed divided by 100; and
$K_1 - K_6$ = constants.

$$MOL\ \%_{METHANE} = -(K_7)(MF_E) + K_8(E_T) + K_9(E_P) - (K_{10})(F_R) - K_{11} \quad (VI)$$

where
MOL $\%_{METHANE}$ = mol percent of methane in the effluent;
$K_7 - K_{11}$ = constants; and
$MF_E$, $E_T$, $E_P$, and $F_R$ are as previously defined.

$$MOL\ \%_{ETHYLENE} = (K_{12})(E_T) + (K_{13})(E_T)(MF_E) - (K_{14})(F_R)(MF_E) - K_{15}(S_R)(MF_E) + (K_{16}) + (K_{16})(E_P)(MF_E) - (K_{17})(MF_E) - K_{18} \quad (VII)$$

where
MOL $\%_{ETHYLENE}$ = mol percent of ethylene in the effluent;
$K_{12} - K_{18}$ = constants; and
$MF_E$, $E_T$, $F_R$, $S_R$ and $E_P$ are as previously defined.

$$MOL\ \%_{ETHANE} = (K_{19})(F_R)(MF_E) - (K_{20})(E_T) + (K_{21})(S_R)(MF_E) - (K_{22})(E_P) + K_{23} \quad (VIII)$$

where
MOL $\%_{ETHANE}$ = mol percent of ethane in the effluent;
$K_{19} - K_{23}$ = constants; and
$F_R$, $S_R$, $E_T$, $E_P$ and $MF_E$ are as previously defined.

$$MOL\ \%_{PROPYLENE} = -(K_{24})(E_T)(MF_E) + K_{25} \quad (IX)$$

where
MOL $\%_{PROPYLENE}$ = mol percent of propylene in the effluent;
$K_{24}$ and $K_{25}$ = constants; and
$E_T$ and $MF_E$ are as previously defined.

$$MOL\ \%_{PROPANE} = (K_{26})(E_T)(MF_E) - (K_{27})(E_T) - (K_{28})(MF_E) + (K_{29})(S_R) - (K_{30})(S_R)(MF_E) + (K_{31})(F_R) - (K_{32})(F_R)(MF_E) - (K_{33})(E_P) + K_{34}(E_P)(MF_E) + K_{35} \quad (X)$$

where
MOL $\%_{PROPANE}$ = mol percent of propane in the effluent;
$K_{26} - K_{35}$ = constants; and
$F_R$, $S_R$, $E_T$, $E_P$ and $MF_E$ are as previously defined.

$$MOL\ \%_{BUTANE} = -(K_{36})(E_T) + (K_{37})(F_R)(MF_E) + (K_{38})(S_R) - (K_{39})(E_P) + (K_{40})(E_P)(MF_E) - (K_{41})(S_R)(MF_E) + K_{42} \quad (XI)$$

where
MOL $\%_{BUTANE}$ = mol percent of butane in the effluent;
$K_{36} - K_{42}$ = constants; and
$F_R$, $S_R$, $E_T$, $E_P$ and $MF_E$ are as previously defined.

$$MOL\ \%_{PENTANE\ PLUS} = (K_{43})(MF_E) + (K_{44})(E_T) + (K_{45})(E_P) - (K_{46})(S_R) - (K_{47})(F_R) + (K_{48})(S_R)(MF_E) + (K_{49})(F_R)(MF_E) + (K_{50})(E_P)(MF_E) - (K_{51})(E_T)(MF_E) - K_{52} \quad (XII)$$

where
MOL $\%_{PENTANE\ PLUS}$ = mol percent of pentane plus in effluent;
$K_{43} - K_{52}$ = constants; and
$F_R$, $S_R$, $E_T$, $E_P$ and $MF_E$ are as previously defined.

$$MOL\ \%_{ACETYLENE} = -(K_{53})(MF_E) + (K_{54})(E_T)(MF_E) - (K_{55})(E_P)(MF_E) - (K_{56})(F_R) + (K_{57})(S_R)(MF_E) + K_{58} \quad (XIII)$$

where
MOL $\%_{ACETYLENE}$ = mol percentage of acetylene in effluent;
$K_{53} - K_{58}$ = constants; and
$F_R$, $S_R$, $E_T$, $E_P$ and $MF_D$ are as previously defined.

$$MOL\ \%_{PROPADIENE} = -(K_{59})(S_R) - (K_{60})(S_R)(MF_E) + (K_{61})(F_R) - (K_{62})(F_R)(MF_E) + (K_{63})(E_T)(MF_E) - K_{64} \quad (XIV)$$

where
MOL $\%_{PROPADIENE}$ = mol percentage of propadiene in effluent;
$K_{59} - K_{64}$ = constants; and
$F_R$, $S_R$, $E_T$ and $MF_E$ are as previously defined.

$$MOL\ \%_{BUTADIENE} = (K_{65})(MF_E) + (K_{66})(E_T) + (K_{67})(E_P)(MF_E) - (K_{68})(S_R)(MF_E) - (K_{69})(F_R)(MF_E) - (K_{70})(E_P) - K_{71} \quad (XV)$$

where
MOL $\%_{BUTADIENE}$ = mol percentage of butadiene in effluent;
$K_{65} - K_{71}$ = constants; and
$F_R$, $S_R$, $E_T$, $E_P$ and $MF_E$ are as previously defined.

$$MOL\ \%_{BUTENE} = (K_{72})(E_T)(MF_E) - (K_{73})(E_T) - (K_{74})(MF_E) + (K_{75})(F_R)(MF_E) - (K_{76})(F_R) + K_{77} \quad (XVI)$$

where
MOL $\%_{BUTENE}$ = mol percentage of butene in effluent;
$K_{72} - K_{77}$ = constants; and
$F_R$, $E_T$ and $MF_E$ are as previously defined.

Equations (V)–(XVI) may be developed by operating the cracking furnace 11 under different operating conditions with the feed rate of the feed mixture and the steam as well as the temperature and pressure of the effluent being varied to give different product distribution curves as a function of the process variables. A curve fitting routine such as the well known linear regression routine is then utilized to develop equations (V)–(XVI) as a function of the product distribution curves. A list of the preferred values for the constants $K_1$ $K_{77}$ follows. These constants may be calculated using product distribution curves and the linear regression curve fitting routine.

$K_1 = 0.21259126 \times 10^{-2}$
$K_2 = 0.29351340 \times 10^1$
$K_3 = 0.16282686 \times 10^{-5}$
$K_4 = 0.10071834 \times 10^{-5}$
$K_5 = 0.16302736 \times 10^{-2}$
$K_6 = 0.15576788 \times 10^0$
$K_7 = 0.35028952 \times 10^0$
$K_8 = 0.58373493 \times 10^{-3}$
$K_9 = 0.16723605 \times 10^{-2}$
$K_{10} = 0.86043901 \times 10^{-6}$
$K_{11} = 0.48793581 \times 10^0$
$K_{12} = 0.66539914 \times 10^{-3}$
$K_{13} = 0.85403390 \times 10^{-3}$
$K_{14} = 0.12875953 \times 10^{-5}$
$K_{15} = 0.65168998 \times 10^{-6}$
$K_{16} = 0.61665419 \times 10^{-3}$
$K_{17} = 0.11733123 \times 10^1$
$K_{18} = 0.72769346 \times 10^0$
$K_{19} = 0.37129993 \times 10^{-5}$
$K_{20} = 0.36132675 \times 10^{-2}$
$K_{21} = 0.28329856 \times 10^{-5}$
$K_{22} = 0.35611414 \times 10^{-2}$
$K_{23} = 0.55168078 \times 10^1$
$K_{24} = 0.50564036 \times 10^{-4}$
$K_{25} = 0.08137489 \times 10^0$
$K_{26} = 0.14820059 \times 10^{-2}$
$K_{27} = 0.14924916 \times 10^{-2}$
$K_{28} = 0.22170964 \times 10^1$
$K_{29} = 0.12817241 \times 10^{-5}$
$K_{30} = 0.12753332 \times 10^{-5}$
$K_{31} = 0.12000062 \times 10^{-5}$
$K_{32} = 0.12730826 \times 10^{-5}$
$K_{33} = 0.19165640 \times 10^{-2}$
$K_{34} = 0.19085632 \times 10^{-2}$
$K_{35} = 0.223321836 \times 10^1$
$K_{36} = 0.10703742 \times 10^{-4}$
$K_{37} = 0.74468893 \times 10^{-8}$
$K_{38} = 0.19003633 \times 10^{-7}$
$K_{39} = 0.46845416 \times 10^{-4}$
$K_{40} = 0.46659562 \times 10^{-4}$
$K_{41} = 0.17271431 \times 10^{-7}$
$K_{42} = 0.01632812 \times 10^0$
$K_{43} = 0.1439295 \times 10^0$
$K_{44} = 0.22350828 \times 10^{-3}$
$K_{45} = 0.69028225 \times 10^{-3}$
$K_{46} = 0.51321728 \times 10^{-6}$
$K_{47} = 0.41024511 \times 10^{-6}$
$K_{48} = 0.41307237 \times 10^{-6}$
$K_{49} = 0.34371381 \times 10^{-6}$
$K_{50} = 0.48382731 \times 10^{-3}$
$K_{51} = 0.12083100 \times 10^{-3}$
$K_{52} = 0.29184742 \times 10^0$
$K_{53} = 0.58333295 \times 10^{-1}$
$K_{54} = 0.36603266 \times 10^{-4}$
$K_{55} = 0.61899691 \times 10^{-4}$
$K_{56} = 0.23057016 \times 10^{-7}$
$K_{57} = 0.18947647 \times 10^{-7}$
$K_{58} = 0.00648064 \times 10^0$
$K_{59} = 0.20740699 \times 10^{-6}$
$K_{60} = 0.21523933 \times 10^{-6}$
$K_{61} = 0.16970365 \times 10^{-6}$
$K_{62} = 0.17487865 \times 10^{-6}$
$K_{63} = 0.53656107 \times 10^{-5}$
$K_{64} = 0.00752710 \times 10^0$
$K_{65} = 0.58224914 \times 10^{-2}$
$K_{66} = 0.69485969 \times 10^{-4}$
$K_{67} = 0.20485346 \times 10$
$K_{68} = 0.63454670 \times 10^{-7}$
$K_{69} = 0.57621877 \times 10^{-7}$
$K_{70} = 0.77964798 \times 10^{-4}$
$K_{71} = 0.092251 \times 10^0$
$K_{72} = 0.80100702 \times 10^{-4}$
$K_{73} = 0.79600759 \times 10^{-4}$
$K_{74} = 0.12733318 \times 10^0$
$K_{75} = 0.33257102 \times 10^{-7}$
$K_{76} = 0.24775105 \times 10^{-7}$
$K_{77} = 0.12697 \times 10^0$ The results of equations (V)–(XVI) are provided as a plurality of output signals of which signal 231 is representative to the molecular weight calculation block 232. The plurality of signals, which are represented by signal 231, are utilized to calculate the molecular weight of the effluent flowing from the cracking furnace 11 in the same manner as previously described for the molecular weight calculation block 201 utilizing equation (I). Signal 233 which is representative of the molecular weight of the effluent flowing from the cracking furnace 11 is provided from the molecular weight calculation block 232 to the predicted conversion calculation block 208.

Signal 231a is representative of either the results of equation (VIII) or the results of equation (X) depending on whether the conversion of ethane or the conversion of propane is being utilized to control the cracking furnace 11. Signal 231a is provided from the predicted effluent analysis block 214 as an input to the predicted conversion calculation block 208.

In response to signals 206, 46a, 233 and 231a the predicted conversion calculation block provides an output signal 235 which is representative of the predicted conversion of either ethane or propane. Equation (IV) is utilized in the predicted conversion calculation block 208 to provide signal 235 in response to the described inputs to the predicted conversion calculation block 208. Signal 235 is provided as an input to the multiplying block 236 and as an input to the lag block 237.

The lag block 237 is a delay which is equal to the time required for a change in the feed flowing through conduit means 15 to the cracking furnace 11 to cause a change in the percent conversion to appear in the effluent flowing through conduit means 19. The output signal 238 from lag block 237 is provided to the dead time block 239. The dead time block 239 is a delay representative of the chromatographic analyzer sample times. The dead time delay represented by the dead time block 239 would typically be on the order of 30 minutes. Signal 241, from the dead time block 239, is thus representative of the predicted conversion delayed so as to compensate for propagation delays through the cracking furnace 11 and to compensate for the chromatographic analyzer sample time. Signal 241 is provided from the dead time block 239 as an input to the dividing block 222.

Signal 221 is divided by signal 241 in the dividing block 222 to establish signal 243. Signal 243 is provided from the dividing block 222 to the lead time block 244.

The lead time block 244 is essentially utilized as a trend predicting device. Thus, if the flow rate of fuel to the cracking furnace 11 has been decreasing over a period of time, the lead time block 244 is utilized to analyze this trend and provide predictive control which parallels a trend. In response to signal 243 the lead time block 244 provides an output signal 245 utilizing equation (XVII).

$$Y = X + \left(\frac{LT}{S_i}\right)(X - X_p) \quad \text{(XVII)}$$

where
Y=the output signal 245 from the lead time block 244;
X=the input signal 243 to the lead time block 244;
LT=a constant;
$S_i$=the sample interval for the computer means 100; and
$X_p$=the value of signal 243 for the previous sample interval.

It is noted that if signal 243 for the present sample interval is equal to signal 243 for the past sample interval that signal 243 will equal signal 245. The output signal 245 from the lead time block 244 is provided as an input to the multiplying block 236.

Signal 235 is multiplied by signal 245 in the multiplying block 236 to provide signal 247 as an input to the controller block 248. Signal 247 is representative of the predicted conversion corrected by the measured conversion. The controller 248 is also provided with a setpoint signal 249 which is representative of the desired percent conversion. In response to signals 247 and 249, the controller 248, which is a digital implementation of a proportional-integral controller, provides an output signal 251 which is responsive to the difference between signals 247 and 249. Signal 251 is scaled so as to be representative of the number of BTUs which must be provided for each pound of feed to maintain the desired percent conversion represented by signal 249. Signal 251 is provided from the controller 248 as an input to the multiplying block 216.

Signal 251 is multiplied by signal 212 in the multiplying block 216 to provide signal 252 which is representative of the number of BTUs/hour which must be provided to the cracking furnace 11 to maintain the actual percent conversion equal to the desired percent conversion represented by signal 249. Signal 252 is provided as one input to the controller block 253.

Signal 96 which is representative of the flow rate of the fuel flowing through conduit means 21 is provided as a first input to the multiplying block 257. Signal 104, which is representative of the number of BTUs which can be provided by each standard cubic foot of fuel, is provided as a second input to the multiplying block 257. Signal 96 is multiplied by signal 104 to provide signal 258 which is representative of the number of BTUs/hour which is being provided by the fuel flowing through conduit means 21. Signal 258 is provided as an input to the controller 253.

In response to signals 252 and 258, the controller block 253, which is a digital implementation of a proportional-integral controller, provides the output signal 117 which is responsive to the difference between signals 252 and 258. Signal 117 is scaled so as to be representative of the presence of the fuel flowing through conduit means 21a and 21b required to maintain an actual percent conversion equal to the desired percent conversion represented by signal 249. Signal 117 is provided as the output from computer means 100 and is utilized as has been previously described in the description of FIG. 1.

The predicted conversion calculation, which is represented by signal 235, provides feedforward control for the cracking furnace 11. The measured percent conversion, represented by signal 221, provides a predicted conversion correction factor for the cracking furnace 11. This is accomplished by dividing the predicted conversion, represented by signal 235, by the measured conversion, represented by signal 221, after the predicted conversion has been delayed. It is noted that, if the predicted conversion, represented by signal 235, is equal to the measured conversion, represented by signal 221, the output of the dividing block 222 will be equal to 1. Thus, if the model being utilized to predict the percent conversion in the cracking furnace under the operating conditions for the cracking furnace is accurate, then no correction factor for predicted conversion is needed. Only when the prediction varies from the actual measured conversion will the actual measured conversion be utilized to correct the prediction. A feedback controller is used on the feedforward predicted conversion to obtain the desired furnace conversion.

The predicted conversion, represented by signal 235, is available much more quickly than the measured conversion represented by signal 221. It is thus noted that the control system of the present invention can react very quickly to a change in any of the process variables associated with the cracking furnace 11. This provides improved control of the craacking furnace 11 which results in the product specifications for the cracking furnace being met with little variance.

The invention has been described in terms of a preferred embodiment as illustrated in FIGS. 1 and 2. Specific components which can be utilized in the practice of the invention as illustrated in FIGS. 1 and 2, such as flow sensors 36, 65 and 92; flow transducers 34, 64, and 91; pressure transducers 29, 51, 81, 132 and 123; temperature transducers 23, 58, and 86; pressure controllers 122 and 121; I/P converters 128 and 137; and pneumatic control valves 139 and 131 are each well known, commercially available control components such as are illustrated and described at length in Perry's *Chemical Engineers' Handbook*, 4th Edition, Chapter 22, McGraw-Hill. A suitable analyzer 41, 71 and 101 is the process chromatograph system, Model 102, manufactured by Applied Automation, Inc., Bartlesville, Okla.

A suitable A/D converter 45, 38, 32, 26, 68, 61, 54, 88, 84, 74, 103 and 94 is the MM 53578 bit A/D converter manufactured by National Semiconductor Corporation, Santa Clara, Calif. A suitable D/A converter 118 is the A/D 5598 bit D/A converter manufactured by Analog Devices, Norwood, Mass. Computer means 100 is preferably an Optrol 3600 manufactured by Applied Automation, Bartlesville, Okla.

While the invention has been described in terms of the presently preferred embodiment, reasonable variations and modifications are possible by those skilled in the art within the scope of the described invention and the appended claims.

That which is claimed is:
1. Apparatus comprising:
a cracking furnace means;

means for supplying a feed stream to said cracking furnace means;

means for supplying a diluent fluid to said cracking furnace means, said diluent fluid being combined with said feed stream;

means for supplying a fuel to said cracking furnace means, the combustion of said fuel supplying heat to said cracking furnace means;

means for removing a gaseous mixture, containing the products produced from the cracked components of said feed stream and containing said diluent fluid, from said cracking furnace means;

means for establishing a first signal representative of a prediction of the mol percentage of said feed stream which will be cracked in said cracking furnace means;

means for establishing a second signal representative of the actual mol percentage of said feed stream cracked in said cracking furnace means;

means for establishing a third signal representative of a correction factor in response to said first signal and said second signal;

means for combining said first signal and said third signal to establish a fourth signal representative of a corrected prediction of the mol percentage of said feed stream which will be cracked in said cracking furance means;

means for establishing a fifth signal representative of the desired mol percentage of said feed stream cracked in said cracking furnace means;

means for comparing said fourth signal and said fifth signal and for establishing a sixth signal responsive to the difference between said fourth signal and said fifth signal; and means for manipulating the heat input to said cracking furnace means in response to said sixth signal.

2. Apparatus in accordance with claim 1 wherein said means for establishing said first signal comprises:

means for establishing a plurality of seventh signals, each one of said plurality of seventh signals being representative of a prediction of the mol percentage of a respective one of the components in said gaseous mixture;

means for establishing a plurality of eighth signals, each one of said plurality of eighth signals being representative of the molecular weight of a respective one of said components in said gaseous mixture;

means for establishing a ninth signal representative of a prediction of the molecular weight of said gaseous mixture in response to said plurality of seventh signals and said plurality of eighth signals;

means for establishing a plurality of tenth signals, each one of said plurality of tenth signals being representative of the actual mol percentage of a respective one of the components in said feed stream;

means for establishing a plurality of eleventh signals, each one of said plurality of eleventh signals being representative of the molecular weight of a respective one of said components in said feed stream;

means for establishing a twelfth signal representative of the actual molecular weight of said feed stream in response to said plurality of tenth signals and said plurality of eleventh signals; and means for establishing said first signal in response to said ninth signal, said twelfth signal, at least one of said plurality of seventh signals, and at least one of said plurality of tenth signals.

3. Apparatus in accordance with claim 2 wherein said means for establishing said plurality of seventh signals comprises:

means for establishing a thirteenth signal representative of the flow rate of said feed stream into said cracking furnace means;

means for establishing a fourteenth signal representative of the flow rate of said diluent fluid into said cracking furnace means;

means for establishing a fifteenth signal representative of the temperature of said gaseous mixture;

means for establishing a sixteenth signal representative of the pressure of said gaseous mixture; and means for establishing said plurality of seventh signals in response to said thirteenth signal, said fourteenth signal, said fifteenth signal, said sixteenth signal and said at least one of said plurality of tenth signals.

4. Apparatus in accordance with claim 3 wherein said means for establishing said ninth signal comprises:

means for multiplying each one of said plurality of seventh signals by a respective one of said plurality of eighth signals which corresponds to the same component in said gaseous mixture; and means for summing the results of the multiplication of each one of said plurality of seventh signals by a respective one of said plurality of eighth signals to establish said ninth signal.

5. Apparatus in accordance with claim 4 wherein said means for establishing said plurality of tenth signals comprises a chromatographic analyzer means.

6. Apparatus in accordance with claim 5 wherein said means for establishing said twelfth signal comprises:

means for multiplying each one of said plurality of tenth signals by a respective one of said plurality of eleventh signals which corresponds to the same component in said feed stream; and means for summing the results of the multiplication of each one of said plurality of tenth signals by a respective one of said plurality of eleventh signals to establish said twelfth signal.

7. Apparatus in accordance with claim 6 wherein said means for establishing said first signal in response to said ninth signal, said twelfth signal, said at least one of said plurality of seventh signals and said at least one of said plurality of tenth signals comprises:

means for multiplying said at least one of said plurality of seventh signals (Mol $\%_{ie}$) by said twelfth signal ($F_m$) to establish a seventeenth signal representative of (Mol $\%_{ie}$)($F_m$);

means for multiplying said at least one of said plurality of tenth signals (Mol $\%_{ie}$) by said ninth signal ($E_m$) to establish an eighteenth signal representative of (Mol $\%_{if}$)($E_m$);

means for dividing said seventeenth signal by said eighteenth signal to establish a nineteenth signal representative of (Mol $\%_{ie}$)($F_m$)/(Mol $\%_{if}$)($E_m$);

means for establishing a twentieth signal representative of the constant +1.0;

means for subtracting said nineteenth signal from said twentieth signal to establish a twenty-first signal representative of (1-(Mol $\%_{ie}$)($F_m$)/(Mol $\%_{if}$)($E_m$);

means for establishing a twenty-second signal representative of the constant 100.0; and means for multiplying said twenty-first signal by said twenty-second signal to establish said first signal.

8. Apparatus in accordance with claim 7 wherein said at least one of said plurality of seventh signals is representative of the predicted mol percent of ethane in said gaseous mixture and said at least one of said plurality of tenth signals is representative of the measured mol percent of ethane in said feed stream.

9. Apparatus in accordance with claim 7 wherein said at least one of said plurality of seventh signals is representative of the predicted mol percent of propane in said gaseous mixture and said at least one of said plurality of tenth signals is representative of the measured mol percent of propane in said feed stream.

10. Apparatus in accordance with claim 1 wherein said means for establishing said second signal comprises:
means for establishing a plurality of seventh signals, each one of said plurality of seventh signals being representative of the actual mol percentage of a respective one of the components in said gaseous mixture;
means for establishing a plurality of eighth signals, each one of said plurality of eighth signals being representative of the molecular weight of a respective one of said components in said gaseous mixture;
means for establishing a ninth signal representative of the actual molecular weight of said gaseous mixture in response to said plurality of seventh signals and said plurality of eighth signals;
means for establishing a plurality of tenth signals, each one of said plurality of tenth signals being representative of the actual mol percentage of a respective one of the components in said feed stream;
means for establishing a plurality of eleventh signals, each one of said plurality of eighth signals being representative of the molecular weight of a respective one of said components in said gaseous mixture;
means for establishing a twelfth signal representative of the actual molecular weight of said feed stream in response to said plurality of tenth signals and said plurality of eleventh signals; and
means for establishing said second signal in response to said ninth signal, said twelfth signal, at least one of said plurality of seventh signals, and at least one of said plurality of tenth signals.

11. Apparatus in accordance with claim 10 wherein said means for establishing said plurality of seventh signals and said plurality of tenth signals comprises a chromatographic analyzer means.

12. Apparatus in accordance with claim 11 wherein said means for establishing said ninth signal comprises:
means for multiplying each one of said plurality of seventh signals by a respective one of said plurality of eighth signals which corresponds to the same component in said gaseous mixture; and
means for summing the results of the multiplication of each one of said plurality of seventh signals by a respective one of said plurality of eighth signals to establish said ninth signal.

13. Apparatus in accordance with claim 11 wherein said means for establishing said twelfth signal comprises:
means for multiplying each one of said plurality of tenth signals by a respective one of said plurality of eleventh signals which corresponds to the same component in said feed stream; and
means for summing the results of the multiplication of each one of said plurality of tenth signals by a respective one of said plurality of eleventh signals to establish said twelfth signal.

14. Apparatus in accordance with claim 13 wherein said means for establishing said second signal in response to said ninth signal, said twelfth signal, said at least one of said plurality of seventh signals and said at least one of said plurality of tenth signals comprises:
means for multiplying said at least one of said plurality of seventh signals (Mol $\%_{ie}$) by said twelfth signal ($F_m$) to establish a seventeenth signal representative of (Mol $\%_{ie}$)($F_m$);
means for multiplying said at least one of said plurality of tenth signals (Mol $\%_{if}$) by said ninth signal ($E_m$) to establish an eighteenth signal representative of (Mol $\%_{if}$) ($E_m$);
means for dividing said seventeenth signal by said eighteenth signal to establish a nineteenth signal representative of (Mol $\%_{ie}$) ($F_m$)/(Mol $\%_{if}$) ($E_m$);
means for establishing a twentieth signal representative of the constant +1.0;
means for subtracting said nineteenth signal from said twentieth signal to establish a twenty-first signal representative of (1-Mol $\%_{ie}$) ($F_m$)/(Mol $\%_{if}$) $E_m$);
means for establishing a twenty-second signal representative of the constant 100.0; and
means for multiplying said twenty-first signal by said twenty-second signal to establish said second signal.

15. Apparatus in accordance with claim 14 wherein said at least one of said plurality of seventh signals is representative of the predicted mol percent of ethane in said gaseous mixture and said at least one of said plurality of tenth signals is representative of the measured mol percent of ethane in said feed stream.

16. Apparatus in accordance with claim 14 wherein said at least one of said plurality of seventh signals is representative of the predicted mol percent of propane in said gaseous mixture and said at least one of said plurality of tenth signals is representative of the measured mol percent of propane in said feed stream.

17. Apparatus in accordance with claim 1 wherein said means for establishing that said third signal comprises means for dividing said second signal by said first signal.

18. Apparatus in accordance with claim 17 additionally comprising:
delay means;
means for providing said first signal to said delay means to thereby delay said first signal before said first signal is used to establish said third signal.

19. Apparatus in accordance with claim 1 wherein said means for combining said first signal and said third signal to establish said fourth signal comprises a multiplying means.

20. Apparatus in accordance with claim 19 additionally comprising:
a lead time means; and
means for providing said third signal to said lead time means to thereby add process trend information to said third signal before said third signal is combined with said first signal to establish said fourth signal.

21. Apparatus in accordance with claim 1 wherein said means for comparing said fourth signal and said fifth signal and for establishing said sixth signal comprises a proportional-integral controller means.

22. Apparatus in accordance with claim 1 wherein said means for manipulating the heat input to said cracking furnace means in response to said sixth signal comprises:

means for establishing a seventh signal representative of the flow rate of said feed stream into said cracking furnace means;

means for multiplying said sixth signal by said seventh signal to establish an eighth signal representative of the number of BTUs which must be provided per unit time to said cracking furnace means by said fuel;

means for establishing a ninth signal representative of the flow rate of said fuel;

means for establishing a tenth signal representative of the heating value of said fuel;

means for multiplying said ninth signal by said tenth signal to produce an eleventh signal which is representative of the number of BTUs which is being provided per unit time to signal cracking furnace means by said fuel;

means for comparing said eighth said and said eleventh signal and for establishing a twelfth signal responsive to the difference between said eighth signal and said eleventh signal, said twelfth signal being representative of the pressure of said fuel required to meet the BTU requirement represented by said eighth signal;

means for establishing a thirteenth signal representative of the means for comparing said twelfth signal and said thirteenth signal and for establishing a fourteenth signal responsive to the difference between said twelfth signal and said thirteenth signal; and means for manipulating the flow rate of said fuel in response to said fourteenth signal.

23. A method for operating a cracking furnace comprising the steps of:

combining a feed stream provided to said cracking furnace with a diluent fluid;

supplying fuel to said cracking furnace, the combustion of said fuel supplying heat to said cracking furnace;

removing a gaseous mixture, containing the products produced from the cracked components of said feed stream and containing said diluent fluid, from said cracking furnace;

establishing a first signal representative of a prediction of the mol percentage of said feed stream which will be cracked in said cracking furnace;

establishing a second signal representative of the actual mol percentage of said feed stream cracked in said cracking furnace;

establishing a third signal representative of a correction factor in response to said first signal and said second signal;

combining said first signal and said third signal to establish a fourth signal representative of a corrected prediction of the mol percentage of said feed stream which will be cracked in said cracking furnace;

establishing a fifth signal representative of the desired mol percentage of said feed stream cracked in said cracking furnace;

comparing said fourth signal and said fifth signal and establishing a sixth signal responsive to the difference between said fourth signal and said fifth signal; and manipulating the heat input to said cracking furnace in response to said sixth signal.

24. A method in accordance with claim 23 wherein said step of establishing said first signal comprises:

establishing a plurality of seventh signals, each of said plurality of seventh signals being representative of a prediction of the mol percentage of a respective one of the components in said gaseous mixture;

establishing a plurality of eighth signals, each one of said plurality of eighth signals being representative of the molecular weight of a respective one of said components in said gaseous mixture;

establishing a ninth signal representative of a prediction of the molecular weight of said gaseous mixture in response to said plurality of seventh signals and said plurality of eighth signals;

establishing a plurality of tenth signals, each one of said plurality of tenth signals being representative of the actual mol percentage of a respective one of the components in said feed stream;

establishing a plurality of eleventh signals, each one of said plurality of eleventh signals being representative of the molecular weight of a respective one of said components in said feed stream;

establishing a twelfth signal representative of the actual molecular weight of said feed stream in response to said plurality of tenth signals and said plurality of eleventh signals; and establishing said first signal in response to said ninth signal, said twelfth signal, at least one of said plurality of seventh signals, and at least one of said plurality of tenth signals.

25. A method in accordance with claim 24 wherein said step of establishing said plurality of seventh signals comprises:

establishing a thirteenth signal representative of the flow rate of said feed stream into said cracking furnace means;

establishing a fourteenth signal representative of the flow rate of said diluent fluid into said cracking furnace means;

establishing a fifteenth signal representative of the temperature of said gaseous mixture;

establishing a sixteenth signal representative of the pressure of said gaseous mixture; and establishing said plurality of seventh signals in response to said thirteenth signal, said fourteenth signal, said fifteenth signal, said sixteenth signal and said at least one of said plurality of tenth signals.

26. A method in accordance with claim 25 wherein said step of establishing said ninth signal comprises:

multiplying each one of said plurality of seventh signals by a respective one of said plurality of eighth signals which corresponds to the same component in said gaseous mixture; and summing the results of the multiplication of each one of said plurality of seventh signals by a respective one of said plurality of eighth signals to establish said ninth signal.

27. A method in accordance with claim 26 wherein said plurality of tenth signals are established by performing a chromatographic analysis on said feed stream.

28. A method in accordance with claim 27 whrein said step of establishing said twelfth signal comprises:

multiplying each one of said plurality of tenth signals by a respective one of said plurality of eleventh signals which corresponds to the same component in said feed stream; and summing the results of the multiplication of each one of said plurality of tenth signals by a respective one of said plurality of eleventh signals to establish said twelfth signal.

29. A method in accordance with claim 28 wherein said step of establishing said first signal in response to said ninth signal, said twelfth signal, said at least one of said plurality of seventh signals and said at least one of said plurality of tenth signals comprises:

multiplying said at least one of said plurality of seventh signals (Mol $\%_{ie}$) by said twelfth signal ($F_m$) to establish a seventeenth signal representative of (Mol $\%_{ie}$)($F_m$);

multiplying said at least one of said plurality of tenth signals (Mol $\%_{ie}$) by said ninth signal ($E_m$) to establish an eighteenth signal representative of (Mol $\%_{if}$) ($E_m$);

dividing said seventeenth signal by said eighteenth signal to establish a nineteenth signal representative of (Mol $\%_{ie}$) ($F_m$)/(Mol $\%_{if}$)($E_m$);

establishing a twentieth signal representative of the constant +1.0;

substracting said nineteenth signal from said twentieth signal to establish a twenty-first signal representative of (1-(Mol $\%_{ie}$)($F_m$)/(Mol $\%_{if}$)($E_m$);

establishing a twenty-second signal representative of the constant 100.0; and muliplying said twenty-first signal by said twenty-second signal to establish said first signal.

30. A method in accordance with claim 29 wherein said at least one of said plurality of seventh signals is representative of the predicted mol percent of ethane in said gaseous mixture and said at least one of said plurality of tenth signals is representative of the measured mol percent of ethane in said feed stream.

31. A method in accordance with claim 29 wherein said at least one of said plurality of seventh signals is representative of the predicted mol percent of propane in said gaseous mixture and said at least one of said plurality of tenth signals is representative of the measured mol percent of propane in said feed stream.

32. A method in accordance with claim 23 wherein said step of establishing said second signal comprises:

establishing a plurality of seventh signals, each one of said plurality of seventh signals being representative of the actual mol percentage of a respective one of the components in said gaseous mixture;

establishing a plurality of eighth signals, each one of said plurality of eighth signals being representative of the molecular weight of a respective one of said components in said gaseous mixture;

establishing a ninth signal representative of the actual molecular weight of said gaseous mixture in response to said plurality of seventh signals and said plurality of eighth signals;

establishing plurality of tenth signals, each one of said plurality of tenth signals being representative of the actual mol percentage of a respective one of the components in said feed stream;

establishing a plurality of eleventh signals, each one of said plurality of eighth signals being representative of the molecular weight of a respective one of said components in said gaseous mixture;

establishing a twelfth signal representative of the actual molecular weight of said feed stream in response to said plurality of tenth signals and said plurality of eleventh signals; and establishing said second signal in response to said ninth signal, said twelfth signal, at least one of said plurality of seventh signals, and at least one of said plurality of tenth signals.

33. A method in accordance with claim 32 wherein said plurality of seventh signals are establishing by performing a chromatographic analysis on said gaseous mixture and said plurality of tenth signals are established by performing a chromatographic analysis of said feed stream.

34. A method in accordance with claim 33 wherein said step of establishing said ninth signal comprises:

multiplying each of said plurality of seventh signals by a respective one of said plurality of eighth signals which corresponds to the same component in said gaseous mixture; and summing the results of the multiplication of each one of said plurality of seventh signals by a respective one of said plurality of eighth signals to establish said ninth signal.

35. A method in accordance with claim 33 wherein said step of establishing said twelfth signal comprises:

multiplying each one of said plurality of tenth signals by a respective one of said plurality of eleventh signals which corresponds to the same component in said feed stream; and summing the results of the multiplication of each one of said plurality of tenth signals by a respective one of said plurality of eleventh signals to establish said twelfth signal.

36. A method in accordance with claim 35 wherein said step of establishing said second signal in response to said ninth signal, said twelfth signal, said at least one of said plurality of seventh signals and said at least one of said plurality of tenth signals comprises:

multiplying said at least one of said plurality of seventh signals (Mol $\%_{ie}$) by said twelfth signal ($F_m$) to establish a seventeenth signal representative of (Mol $\%_{ie}$)($F_m$);

multiplying said at least one of said plurality of tenth signals (Mol $\%_{if}$) by said ninth signal ($E_m$) to establish an eighteenth signal representative of (Mol $\%_{if}$) ($E_m$);

dividing said seventeenth signal by said eighteenth signal to establish a nineteenth signal representative of (Mol $\%_{ie}$) ($F_m$)/(Mol $\%_{if}$) ($E_m$);

establishing a twentieth signal representative of the constant +1.0;

subtracting said nineteenth signal from said twentieth signal to establish a twenty-first signal representative of (1-(Mol $\%_{ie}$) ($F_m$)/(Mol $\%_{if}$) ($E_m$);

establishing a twenty-second signal representative of the constant 100.0; and multiplying said twenty-first signal by said twenty-second signal to establish said second signal.

37. A method in accordance with claim 36 wherein said at least one of said plurality of seventh signals is representative of the predicted mol percent of ethane in said gaseous mixture and said at least one of said plurality of tenth signals is representative of the measured mol percent of ethane in said feed stream.

38. A method in accordance with claim 36 wherein said at least one of said plurality of seventh signals is representative of the predicted mol percent of propane in said gaseous mixture and said at least one of said plurality of tenth signals is representative of the measured mol percent of propane in said feed stream.

39. A method in accordance with claim 23 wherein said step of establishing that said third signal comprises dividing said second signal by said first signal.

40. A method in accordance with claim 39 additionally comprising the step of:
delaying said first signal before said first signal is used to establish said third signal.

41. A method in accordance with claim 23 wherein said step of combining said first signal and said third signal to establish said fourth signal comprises multiplying said first signal by said third signal.

42. A method in accordance with claim 41 additionally comprising the step of:
adding process trend information to said third signal before said third signal is combined with said first signal to establish said fourth signal.

43. A method in accordance with claim 23 wherein said step of manipulating the heat input to said cracking furnace in response to said sixth signal comprises:
establishing a seventh signal representative of the flow rate of said feed stream into said cracking furnace means;
multiplying said sixth signal by said seventh signal to establish an eighth signal representative of the number of BTUs which must be provided per unit time to said cracking furnace by said fuel;
establishing a ninth signal representative of the flow rate of said fuel;
establishing a tenth signal representative of the heat value of said fuel;
multiplying said ninth signal by said tenth signal to produce an eleventh signal which is representative of the number of BTUs which is being provided per unit time to said cracking furnace means by said fuel;
comparing said eighth signal and said eleventh signal and establishing a twelfth signal responsive to the difference between said eighth signal and said eleventh signal, said twelfth signal being representative of the pressure of said fuel required to meet the BTU requirement represented by said eighth signal;
establishing a thirteenth signal representative of the actual pressure of said fuel;
comparing said twelfth signal and said thirteenth signal and for establishing a fourteenth signal responsive to the difference between said twelfth signal and said thirteenth signal; and
manipulating the flow rate of said fuel in response to said fourteenth signal.

* * * * *

UNITED STATES PATENT AND TRADEMARK OFFICE
CERTIFICATE OF CORRECTION

PATENT NO. : 4,236,218
DATED : November 25, 1980
INVENTOR(S) : Wilbur N. Killebrew et al It is certified that error appears in the above-identified patent and that said Letters Patent are hereby corrected as shown below:

Column 19, claim 22, line 20, after "to", delete "signal" and insert --- said ---;

line 22, after "eighth", delete "said" and insert --- signal ---.

Column 20, claim 24, line 5, after "each", insert --- one ---.

Column 20, claim 28, line 65, after "27", delete "whrein" and insert --- wherein ---.

Column 22, claim 34, line 15, after "each", insert --- one ---.

Signed and Sealed this

Twentieth Day of October 1981

[SEAL]

Attest:

GERALD J. MOSSINGHOFF

*Attesting Officer*    *Commissioner of Patents and Trademarks*